United States Patent [19]

Wilkinson

[11] 4,419,693
[45] Dec. 6, 1983

[54] ERROR CONCEALMENT IN DIGITAL TELEVISION SIGNALS

[75] Inventor: James H. Wilkinson, Tadley, Near Basingstoke, United Kingdom

[73] Assignee: Sony Corporation, Tokyo, Japan

[21] Appl. No.: 248,861

[22] Filed: Mar. 30, 1981

[30] Foreign Application Priority Data

Apr. 2, 1980 [GB] United Kingdom ............... 8011090

[51] Int. Cl.³ .............................................. H04N 5/21
[52] U.S. Cl. ................................... 358/167; 358/336; 382/42
[58] Field of Search ..................... 358/16, 36, 37, 13, 358/39, 40, 133, 160, 166, 167, 213, 260, 314, 336; 364/515; 360/38.1

[56] References Cited

U.S. PATENT DOCUMENTS 3,946,432  3/1976  Goldberg et al. ................... 358/13
4,275,418  6/1981  Trump ................................. 358/167
4,365,273 12/1982  Yamada et al. ..................... 358/260

OTHER PUBLICATIONS

SMPTE Journal, vol. 87, No. 3, pp. 129–133, Mar. 1978.

Primary Examiner—Robert L. Richardson
Attorney, Agent, or Firm—Lewis H. Eslinger; Alvin Sinderbrand

[57] ABSTRACT

A method of concealing errors in a digital television signal formed by a plurality of sample signals corresponding respectively to sample positions along a horizontal scan line of a television picture made up of a plurality of such lines, the method comprising, in respect of each sample signal which is in error, selecting from a plurality of algorithms a preferred algorithm for correcting the error sample signal, calculating a corrected value of the error sample signal using the preferred algorithm, and substituting the corrected sample signal for the error sample signal so as to conceal the error. The algorithms may be four in number and use sample values located along four different directions respectively, such as the horizontal, the vertical, and the two diagonal directions of the television raster, to predict the known sample values at sample positions adjacent to the position of the error sample signal, the algorithm giving the best result being selected.

14 Claims, 14 Drawing Figures

ERROR CONCEALMENT IN DIGITAL TELEVISION SIGNALS

BACKGROUND OF THE INVENTION

1. Field of the Invention

This invention relates to error concealment in digital television signals.

2. Description of the Prior Art

Recently there has been an increasing interest in the use of digital techniques for television signals. Such techniques are, for example, used in some video tape recording arrangements where an incoming television signal to be recorded is sampled, the samples are coded into digital form, the digital data signals are recorded and subsequently reproduced by a video tape recorder (VTR), the reproduced digital data signals are decoded, and the decoded signals are used to form an analog signal corresponding to the original television signal.

If errors occur in the handling of the digital signals, for example due to noise or tape drop-out occurring in the VTR, the digital signals are corrupted and then the reformed television signal does not correspond exactly to the original television signal, and a resulting television picture is degraded.

There are two main approaches to dealing with errors in digital television signals. The first approach is correction, which involves the production and use of additional data signals purely for the purposes of error detection and correction, these additional data signals otherwise being redundant. While correction provides good results, it cannot generally be used as the sole means of dealing with errors, because a comprehensive correction capability would require an excessive amount of additional data which might overload the data handling paths or raise the data rate to an unacceptable level. The second approach, with which the present invention is more particularly concerned, is concealment. This comprises the replacement of corrupted data signals by data signals generated using available uncorrupted data signals. This method relies largely for accuracy on the strong correlation that exists in a television signal.

Had a frequency of four times the frequency of the color sub-carrier been adopted as the base sampling frequency for digital television systems, then there would have been a substantial margin between the highest video frequency (5.5 MHz) and the Nyquist frequency (8.8 MHz). This would have allowed a very useful headroom for correcting errors using a fairly straight-forward concealment technique. In general, a concealment technique using standard digital filtering in one dimension gives the kind of response indicated in FIG. 1 of the accompanying drawings in which the concealment error is plotted as ordinates against the usable concealment frequencies as abscissae. The Nyquist fraction is the ratio of the frequency at which the concealment error exceeds a certain limit to the value of the Nyquist frequency. It will be seen from FIG. 1 that the Nyquist frequency represents the point on the graph at which concealment error rises rapidly to unacceptably poor levels.

Figure 1:
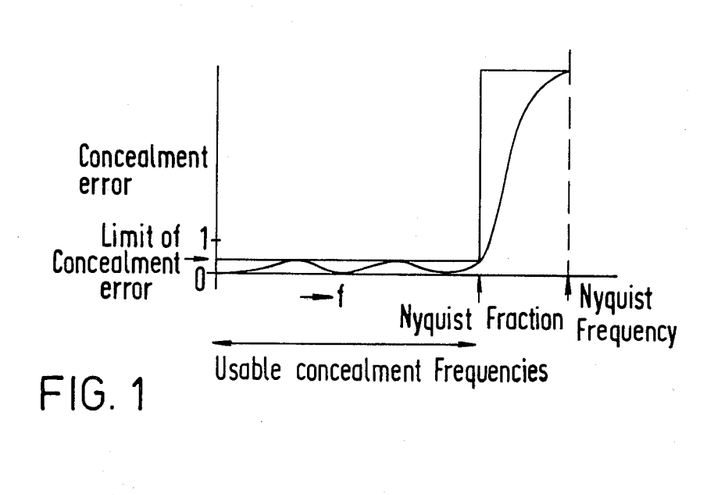
FIG. 1 is a graph illustrating the variation of concealment error with frequency.

As it is practically impossible to achieve a Nyquist fraction of unity, some lower value must be chosen and it has been shown that a value of up to 0.85 can be achieved. The current recommendation for the sampling frequency for digital television systems is for a component system using 12 MHz for the luminance signal and 4 MHz for each of the color difference signals, the lower frequency being acceptable for the color difference signals because the eye is less sensitive to differences in color than to differences in luminance. The luminance Nyquist frequency is therefore 6 MHz. If a Nyquist fraction of 0.85 is chosen, then the highest frequency which can satisfactory be concealed is 5.1 MHz. This means that if the video signal is not filtered correctly, and in particular if there is not a very rapid roll-off from 5 MHz onwards, then any errors occurring in signals having these higher frequencies will be concealed very poorly, to the extent of being more visible than the original error.

There are two problems which can arise:

Firstly, the concealment will only work correctly if all the samples which are to be used for concealment and which surround the sample in error are themselves error-free. Statistically, this situation is highly improbable. For example, if the off-tape error is one in $10^{-5}$ and this error is taken as p, then two or more errors are likely to occur within a limit of ± eight samples on either side of another error with a frequency which is approximately equal to 8.5 $p^2$, which is $0.85 \times 10^{-9}$. At present data rates this is approximately once every 6 seconds. However, two considerations are known to increase the error rate substantially. The first of these is that when an error is detected in a data word it is common to assume that five data words on either side of the error data word are also in error, and this of course increases the probability of an error or assumed error by a factor of about ten. Secondly, in order to reduce the rate of statistical errors the bandwidth of the off-tape signal is reduced to the minimum possible. This, however, increases the data-dependent errors such as pattern sensitivity, and these error types do not obey the normal probability equations. It is believed that this will increase the probability of multiple errors, although the level of increase is unknown.

Secondly, at the start and end of a horizontal scan line, there are no picture samples in existence since most of the blanking period is removed prior to recording. The vertical edge of a television picture may well therefore be prone to poor concealment, since the criterion for developing the concealment coefficients assumes useful samples on either side of the error sample. In practice, this may be overcome reasonably well by generating a suitable number of artifical samples at the beginning and end of each horizontal line scan.

OBJECT AND SUMMARY OF THE INVENTION

One object of the present invention is to provide an improved method and apparatus for concealing errors in digital television signals.

Another object of the present invention is to provide a method and apparatus for concealing errors in digital television signals using selection of one correction algorithm from a plurality of correction algorithms.

Another object of the present invention is to provide a method and apparatus for concealing errors in digital television signals using sample values which are adjacent to an error sample value and which are located along a selected one of the horizontal, vertical, positive diagonal and negative diagonal directions of the television raster.

According to the present invention there is provided a method of concealing errors in a digital television signal, which television signal comprises a plurality of sample signals corresponding relatively to sample positions along a horizontal scan line of a television picture made up of a plurality of such lines, the method comprising, in respect of each said sample signal which is in error:

selecting from a plurality of algorithms a preferred algorithm for correcting said error sample signal;

calculating a corrected value of said error sample signal using said preferred algorithm; and substituting said corrected sample signal for said error sample signal so as to conceal the error.

Said method may comprise:

using a first algorithm to calculate from available sample signals the expected value of a first sample signal corresponding to a first sample position adjacent to the sample position of said error sample signal;

checking said expected value of said first sample signal against the actual value of said first sample signal;

using a second algorithm to calculate from available sample signals the expected value of a second sample signal corresponding to a second sample position adjacent to the sample position of said error sample signal;

checking said expected value of said second sample signal against the actual value of said second sample signal; and selecting one of said first and second algorithms in dependence on the results of said checking steps and using said selected algorithm to calculate from available sample signals said corrected value of said error sample signal;

said first and second algorithms using available sample signals located along respective different directions and/or in respective different dimensions of said television picture.

According to the present invention there is also provided apparatus for concealing errors in a digital television signal, which television signal comprises a plurality of sample signals corresponding respective to sample positions along a horizontal scan line of a television picture made up of a plurality of such lines, the apparatus comprising:

means operative in respect of each said sample signal which is in error to select from a plurality of algorithms a preferred algorithm for correcting said error sample signal;

means to calculate a corrected value of said error sample signal using said preferred algorithm; and means to substitute said corrected sample signal for said error sample signal so as to conceal said error.

Said apparatus may comprise:

means operative in respect of each said sample signal which is in error to use a first algorithm to calculate from available sample signals the expected value of a first sample signal corresponding to a first sample position adjacent to the same position of said error sample signal;

means to check said expected value of said first sample signal against the actual value of said first sample signal;

means to use a second algorithm to calculate from available sample signals the expected value of a second sample signal corresponding to a second sample position adjacent to the sample position of said error sample signal;

means to check said expected value of said second sample signal against the actual value of said second sample signal; and means to select one of said first and second algorithms in dependence on the results of said checking steps and to use said selected algorithm to calculate from available sample signals said corrected value of said error sample signal;

said first and second algorithms using sample signals located along respective different directions and/or in respective different dimensions of said television picture.

Preferably said different directions and/or different dimensions of said television picture comprise four different directions, these directions being the horizontal, vertical, positive diagonal and negative diagonal directions of the television picture. The different dimensions may include not only the horizontal and vertical dimensions but also the time dimension, meaning preceding and succeeding frames or fields. The term "directions" as used in the description and in the claims is intended to comprehend both the spacewise dimensions and the timewise dimension.

The above, and other objects, features and advantages of this invention will be apparent from the following detailed description of an illustrative embodiment which is to be read in connection with the accompanying drawings.

DESCRIPTION OF THE PREFERRED EMBODIMENT

Figure 2:
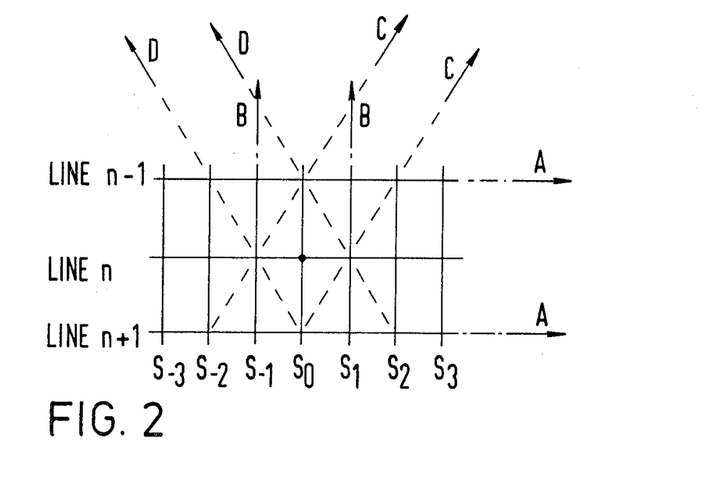
FIG. 2 shows a matrix of sample positions in a television picture.

Referring to FIG. 2, this shows part of a television raster, and in particular part of three consecutive horizontal scan lines labelled line n−1, line n and line n+1. The luminance sample positions are disposed at regular intervals along each of the lines, the intervals corresponding to a luminance sampling frequency of 12 MHz, and the sample positions being aligned in the vertical direction. Reading from the left, consecutive sample positions in each line are labelled S−3, S−2, S−1, S0, S1, S2 and S3. Using this notation, any sample position in the matrix can be designed by the line and the sample number, and for purposes of this discussion it is assumed that the sample position at which there is an error sample signal requiring concealment is in line n at position S0, this being designated n, S0.

Consideration of FIG. 2 will indicate that a corrected value for the sample position n, S0 could be estimated in one of four different ways. Firstly, the average could be taken of the two samples in line n adjacent to and on each side of the sample position n, S0. Secondly, the average could be taken of the two sample values in line n−1 and line n+1 adjacent to and vertically above and below the sample position n, S0. Thirdly, the average could be taken of the two sample values in line n−1 and line n+1 and on either side of the sample position n, S0 along the positive diagonal direction. Fourthly, the average could be taken of the two sample values in line n−1 and line n+1 adjacent to and on either side of the sample position n, S0 and along the negative diagonal direction. These four directions are indicated by the arrows A, B, C and D respectively.

Each of these possibilities may be thought of as an algorithm for calculating a corrected value, and it will be appreciated that it is likely that one of these algorithms will give a better result than any of the others. The preferred algorithm to be used is therefore selected by testing each algorithm using known sample values to see which gives the best result. For example, the first possibility mentioned above can be tested by using the sample values at the sample positions (n−1), S−1 and (n−1), S1 to calculate the value at the sample position (n−1), S0. As the value at this latter position is known, this provides a check on the accuracy of that algorithm when used for that particular television signal at that particular position. Likewise, a similar check can be carried out using the same algorithm in respect of the line n+1. Likewise, similar checks can be carried out using the other three algorithms, and the algorithm giving the best result is selected.

As a further refinement, the results derived from the respective algorithms can be weighted. In other words, a value can be placed on the likely accuracy of the results obtained. This is necessary because the distance between adjacent sample positions is less in the horizontal direction than in the vertical direction, the difference amounting to a factor of approximately 1.625. For this reason, the algorithm using the horizontal direction is in fact most likely to give the nearest result, with the algorithm for the vertical direction being next best, and the two algorithms for the diagonal directions being the next best thereafter.

The four algorithms referred to above will now be specified in mathematical terms. Thus, the decision of concealment direction is made by investigating the adjacent sample values and obtaining the concealment accuracy for each direction. If the concealment accuracy is H for the horizontal direction, V for the vertical direction, D+ for the positive diagonal direction and D− for the negative diagonal direction, then these concealment accuracies can be defined as follows:

$$H = \tfrac{1}{2}|\tfrac{1}{2}[(n-1),S-1 + (n-1),S+1] - (n-1),S0| + \qquad (1)$$

$$\tfrac{1}{2}|\tfrac{1}{2}[(n+1),S-1 + (n+1),S+1] - (n+1),S0|$$

that is to say, the concealment accuracy H equals the average of the horizontal concealment accuracy from the horizontal line immediately above and the horizontal line immediately below the horizontal line containing the error sample.

Likewise:

$$V = \tfrac{1}{2}|\tfrac{1}{2}[(n-1),S-1 + (n+1),S-1] - n,S-1| + \qquad (2)$$

$$\tfrac{1}{2}|[\tfrac{1}{2}\{(n-1),S1 + (n+1),S1\} - n,S1]|$$

$$D^+ = \tfrac{1}{2}|\tfrac{1}{2}[(n-1),S-2 + (n+1),S0] - n,S-1| + \qquad (3)$$

$$\tfrac{1}{2}|\tfrac{1}{2}[(n-1),S0 + (n+1),S2] - n,S1|$$

$$D^- = \tfrac{1}{2}|\tfrac{1}{2}[(n-1),S0 + (n+1),S-2] - n,S-1| + \qquad (4)$$

$$\tfrac{1}{2}|\tfrac{1}{2}[(n-1),S2 + (n+1),S0] - n,S1|$$

These four values H, V, D+ and D− represent the accuracy of concealment for the sample values most closely connected with the error sample. Preferably these values are each assigned a weighting coefficient to take account of the unequal spacings of the horizontal, vertical and diagonal samples. The smallest value is then used to select the direction of concealment.

Although it is assumed that only the next adjacent samples are used for forming the calculated values, this is not necessarily the case, and there may be instances where it is desirable to extend the averaging to take in further samples successively spaced along the various directions. Also, having in mind that the horizontal and vertical directions referred to above may equally well be considered as dimensions of the television picture, the method can be extended into the third dimension, that is to say the time dimension. Thus, the calculated values may be determined making use of corresponding sample positions in one or more preceding and one or more succeeding fields or even frames of the television signal. This increases the number of algorithms available for use, but the actual algorithms selected for use and the number of algorithms (from two upwards) used will depend on the particular situation in which the invention is to be applied.

Figure 3A:
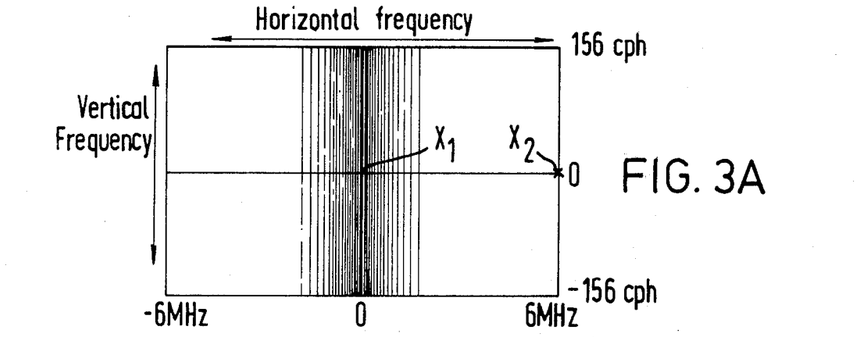
FIG. 3A shows the relationship between concealment and frequency in the horizontal direction.
Figure 3B:
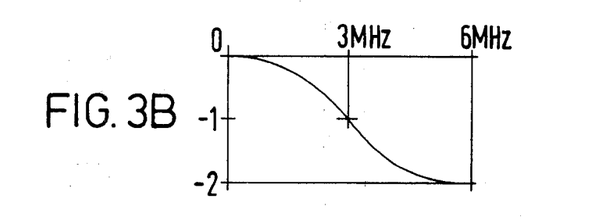
FIG. 3B shows the amplitude of concealment error in the horizontal direction as a section on the line X1-X2 of FIG. 3A.

Referring now to FIGS. 3A and 3B, the first (FIG. 3A) shows the relationship between concealment and frequency in the horizontal direction. The abbreviation cph means cycles per picture height. The second (FIG. 3B) shows the amplitude of the concealment error in the horizontal direction as a section on the line X1–X2 of FIG. 3A.

Figure 4A:
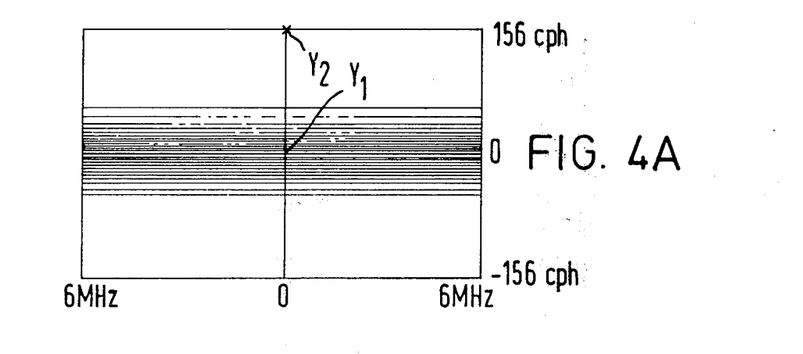
FIG. 4A shows the relationship between concealment and frequency in the vertical direction.
Figure 4B:
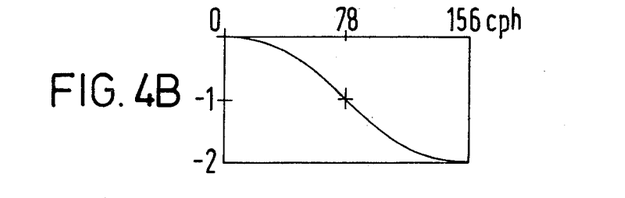
FIG. 4B shows the amplitude of concealment error in the vertical direction as a section on the line Y1-Y2 of FIG. 4A.

FIGS. 4A and 4B are similar except that they are for the vertical direction, and FIG. 4B is a section on the line Y1–Y2 of FIG. 4A.

Figure 5A:
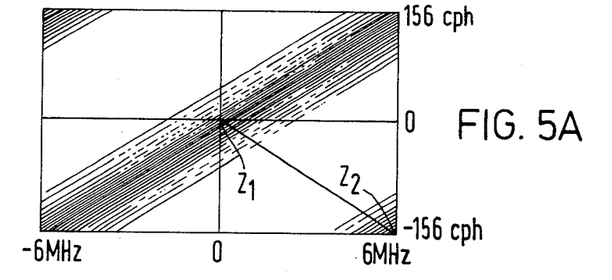
FIG. 5A shows the relationship between concealment and frequency in the positive diagonal direction.
Figure 5B:
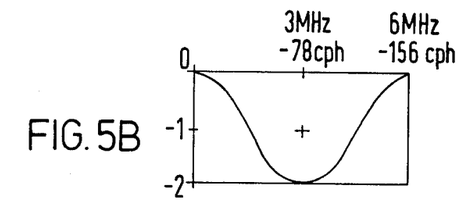
FIG. 5B shows the amplitude of concealment error in the positive diagonal direction as a section on the line Z1-Z2 of FIG. 5A.

FIGS. 5A and 5B are similar except that they are for the positive diagonal direction, and FIG. 5B is a section on the line Z1–Z2 of FIG. 5A.

Figure 6A:
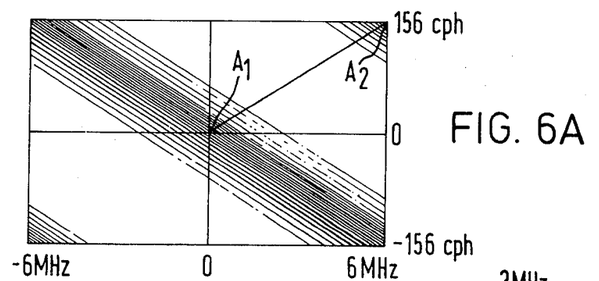
FIG. 6A shows the relationship between concealment and frequency in the negative diagonal direction.
Figure 6B:
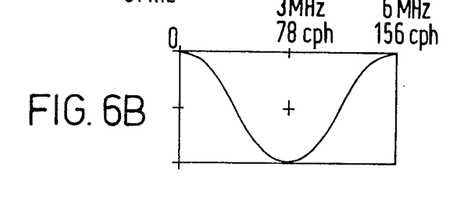
FIG. 6B shows the amplitude of concealment error in the negative diagonal direction as a section on the line A1-A2 of FIG. 6A.

FIGS. 6A and 6B are similar except that they are for the negative diagonal direction, and FIG. 6B is a section on the line A1–A2 of FIG. 6A.

It will particularly be noticed that each of the responses shown in FIGS. 3 to 6 shows zero error where the greatest density of sample frequencies exist, that is to say around zero frequency. Moreover, the responses cover most of the frequencies existing within the Nyquist limits in each direction.

Figure 7A:
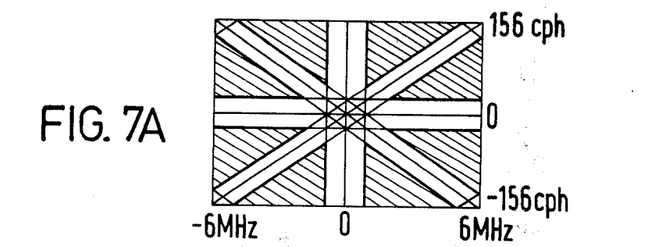
FIGS. 7A, 7B and 7C indicate the distribution of 1 dB, 3 dB, and 6 dB concealment error respectively.
Figure 7B:
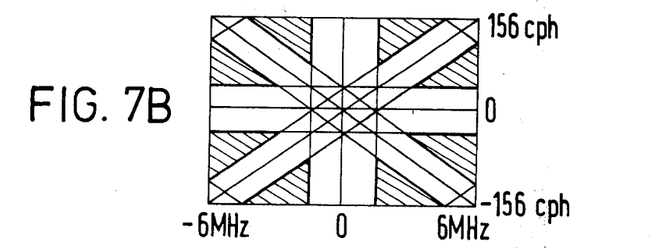
Figure 7C:
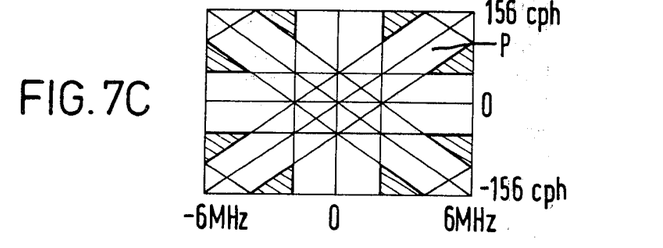

FIGS. 7A to 7C show the total potential coverage of the four concealment algorithms, the shaded area showing the frequencies not concealed to the required accuracy, the required accuracy being 1 dB in FIG. 7A, 3 dB in FIG. 7B and 6 dB in FIG. 7C. In these three figures the scaling of the vertical and horizontal axes take account of the relative spatial positions of the adjacent sample positions in the vertical and horizontal directions, this ratio being approximately 1:1.625, as mentioned above.

It will be seen from these figures that a concealment error of within 0.5 ensures approximately 90% coverage of the frequency spectrum, that part of the spectrum not covered being in fairly remote areas, that is to say at frequencies substantially removed from zero frequency.

These figures also illustrate the value of selecting the algorithm which givess the best result. In some cases the answer is fairly obvious. For example, if a television picture is changing line by line, then clearly the algorithm for the horizontal direction will give the best correction. Also, for a sample which falls near the centre of any of FIGS. 7A to 7C the direction selected is probably not critical. However, for a sample which falls at the point P in FIG. 7C, selection of the algorithm for the positive diagonal direction will give the best concealment.

The method has been described as applied to the luminance channel, that is say concealment of errors occuring in luminance sample values. It is also necessary to consider the color difference channels, and here two possibilities arise.

Firstly, each color difference channel can be provided with a separate concealment selection arrangement independent of the arrangement for the luminance channel.

Secondly, because the first solution referred to above increases the amount of hardware required by approximately three, an alternative method which economizes on the amount of hardware required makes use of the fact that the chrominance information is related to the luminance information. That is, where a chrominance edge exists, so usually does a luminance edge. Based on this assumption it is possible to select the direction of color difference concealment to be the same as that selected for luminance concealment. However, because the chrominance samples occur at only one-third the frequency of the luminance samples along each horizontal line, a different set of weighting coefficients has to be used, these being optimized to the chrominance bandwidths.

Figure 8:
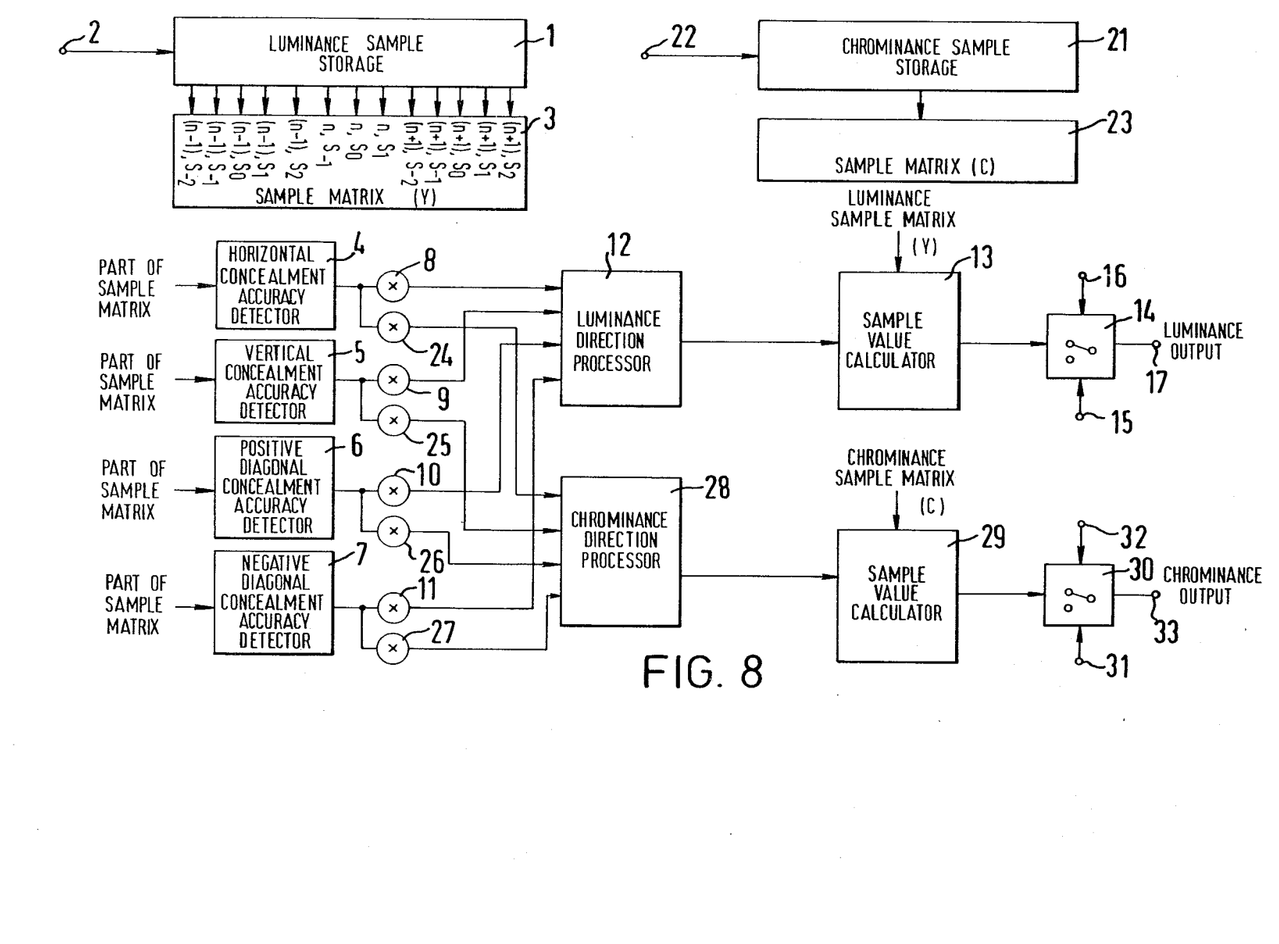
FIG. 8 shows in simplified block form apparatus according to the invention for concealing errors in a digital television signal.

Referring to FIG. 8, this shows apparatus for concealing errors in a digital television signal. The apparatus comprises a luminance sample storage means 1 to which luminance input samples are supplied by way of an input terminal 2. The luminance sample storage means 1 supplies outputs to a luminance sample matrix storage means 3 which stores a moving matrix of sample values corresponding to the sample positions (n+1),S2; (n+1),S1; (n+1),S0; (n+1),S−1; (n+1),S−2; n,S1; n,S0; n,S−1; (n−1),S2; (n−1),S1; (n−1),S0; (n−1),S−1; and (n−1),S−2.

Four concealment accuracy detectors are provided, these being a horizontal concealment accuracy detector 4, a vertical concealment accuracy detector 5, a positive diagonal concealment accuracy detector 6 and a negative diagonal concealment accuracy detector 7. Each of the concealment accuracy detectors 4 to 7 is continuously supplied with the appropriate part of the sample matrix from the luminance sample matrix storage means 3. Thus the horizontal concealment accuracy detector 4, for example, receives or selects the sample values necessary to calculate the concealment accuracy H using algorithm (1) above, and supplies a signal representing the concealment accuracy H by way of a weighting multiplier 8 to a luminance direction processor 12. Likewise the concealment accuracy detectors 5 to 7 supply a respective signal representing the vertical concealment accuracy V, the positive diagonal concealment accuracy D+ and the negative diagonal concealment accuracy D− by way of weighting multipliers 9, 10, and 11 respectively to the luminance direction processor 12. The weighting multipliers 8 to 11 effect the weighting referred to above to compensate for the different distances between adjacent sample positions in the various directions. The weighting may be done simply on the basis of distance between adjacent sample positions, in which case each weighting multiplier multiplies by the reciprocal of the distance between adjacent sample positions in the relevant direction. Other weightings can, however, be used.

The luminance direction processor 12 supplies an output signal representing the selected direction of concealment to a sample value calculator 13 which operates to select the appropriate samples from the luminance sample matrix storage means 3 and calculate therefrom the required concealment value to be used to conceal the error sample. For example, if the horizontal direction is selected, the sample value calculator 13 uses the sample values for the sample positions n,S−1 and n,S+1 to calculate the value to be used to conceal the error sample at the sample position n, S0. The concealment value is supplied to a selector 14 to which a switching signal is supplied by way of a terminal 15. The selector 14 is also supplied with the sample value from the sample position n,S0 by way of a terminal 16.

Preferably the apparatus as so far described operates continuously, that is say concealment values are determined as described for every sample position and supplied to the selector 14. Only, however, when it has been determined that there is an error at a given sample position n,S0, is a signal supplied to the selector 14 by way of the terminal 15, whereupon the concealment value supplied from the calculator 13 is supplied to a luminance output terminal 17 in place of the sample value supplied by way of the terminal 16. At all other times, the sample value supplied by way of the terminal 16 is supplied to the luminance output terminal 17.

The fact that there is an error at a given sample position n,So can be determined in any suitable manner. For example, it may be determined that the data word representing the sample value is not valid. As a more specific example, suppose that each sample value is coded into a word in the sub-set of 10-bit words which consist of 5 "0" and 5 "1"; this being convenient for magnetic recording and reproduction because of the large number of transients and the ease of clock recovery. In this case any reproduced data word not having 5 "0" and 5 "1" is not a valid member of the sub-set and so is clearly an error. Thereupon a switching signal is supplied to the terminal 15.

The apparatus may also include arrangements for calculating concealment values for the color difference channels U and V. For simplicity, only that part of the apparatus necessary to calculate concealment values for the difference channel U is shown and will be described. For this purpose the apparatus comprises a chrominance sample storage means 21 to which chrominance input samples are supplied by way of an input terminal 22. The chrominance sample storage means 21 supplies outputs to a chrominance signal matrix storage means 23 which stores a moving matrix of sample values corresponding to those listed above in connection with the luminance sample matrix storage means 3, but adjusted to take account of the different spacing between adjacent chrominance samples.

Operating in time division multiplex for the luminance and chrominance samples, respectively, the concealment accuracy detectors 4 to 7 derive signals representing the horizontal, vertical, positive diagonal and negative diagonal concealment accuracies H, V, V+, and V− for the chrominance difference channel U and supply the signals by way of respective chrominance weighting multipliers 24, 25, 26, and 27 to a chrominance direction processor 28 which supplies an output signal representing the selected direction of concealment to a sample value calculator 29 which operates to select the appropriate samples from the chrominance sample matrix storage means 23 and calculate therefrom the required concealment value to be used to conceal the error sample. The concealment error is supplied to a selector 30 to which a switching signal is supplied by way of a terminal 31. The selector 30 is also supplied with the sample value from the sample position n,S0 by way of a terminal 32.

As with the luminance part of the apparatus, the chrominance part of the apparatus preferably operates continuously. Only, however, when it has been determined there is an error at a given sample position n,S0, is a signal supplied to the selector 30 by way of the terminal 31, whereupon the concealment value supplied from the calculator 29 is supplied to a chrominance output terminal 33 in place of the sample value supplied by way of the terminal 32.

The chrominance part of the apparatus may be duplicated for the color difference channel V or, alternatively, hardware can be saved by also using the algorithm selected for the color difference channel U for the color difference channel V.

It will be noted that the invention is not limited to any particular form of television system and it may, for example, equally well be applied to a television signal of the PAL system or the NTSC system. Moreover, the invention is not limited to concealment of errors which have arisen in the course of recording reproducing from a VTR, but may be used in any situation where errors have arisen in processing, transmitting or handling a digital television signal.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A method of concealing errors in a digital television signal, which television signal comprises a plurality of sample signals corresponding respectively to sample positions along a horizontal scan line of a television picture made up of a plurality of such lines, the method comprising, in respect of each said sample signal which is in error:

selecting from a plurality of algorithms a preferred algorithm for correcting such error sample signal;

calculating a corrected value of said error sample signal using said preferred algorithm;

substituting said corrected value of said error sample signal for said error sample signal so as to conceal the error; and supplying said digital television signal having said corrected values of said error sample signal to an output for use in a television signal processing device.

2. A method according to claim 1 comprising:

using a first algorithm to calculate from available sample signals the expected value of a first sample signal corresponding to a first sample position adjacent to the sample position of said error sample signal;

checking said expected value of said first sample signal against the actual value of said first sample signal;

using a second algorithm to calculate from available sample signals the expected value of a second sample signal corresponding to a second sample position adjacent to the sample position of said error sample signal;

checking said expected value of said second sample signal against the actual value of said second sample signal; and selecting one of said first and seciond algorithms in dependence on the results of said checking steps and using said selected algorithm to calculate from available sample signals said corrected value of said error sample signal;

said first and second algorithms using available sample signals located along respective different directions of said television picture.

3. A method according to claim 1 comprising:

using a first algorithm to calculate from available sample signals the expected value of a first sample signal corresponding to a first sample position adjacent to the sample position of said error sample signal;

checking said expected value of said first sample signal against the actual value of said first sample signal;

using a second algorithm to calculate from available sample signals the expected value of a second sample signal corresponding to a second sample position adjacent to the sample position of said error sample signal;

checking said expected value of said second sample signal against the actual value of said second sample signal;

using a third algorithm to calculate from available sample signals the expected value of a third sample signal corresponding to a third sample position adjacent to the sample position of said error sample signal;

checking said expected value of said third sample signal against the actual value of said third sample signal;

using a fourth algorithm to calculate from available sample signals the expected value of a fourth sample signal corresponding to a fourth sample position adjacent to the sample position of said error sample signal;

checking said expected value of said fourth sample signal against the actual value of said fourth sample signal; and selecting one of said first to fourth algorithms in dependence on the results of said checking steps and using said selected algorithm to calculate from available sample signals said corrected value of said error sample signal;

said first to fourth algorithms using available sample signals located along respective different directions of said television picture.

4. A method according to claim 3 wherein said different directions are the horizontal, vertical, positive diagonal and negative diagonal directions of said television picture.

5. A method according to claim 4 wherein said first algorithm is used to calculate a horizontal concealment accuracy H as follows:

$$H = \tfrac{1}{2}|\tfrac{1}{2}[(n-1),S-1, + (n-1),S+1] - (n-1),S0| +$$
$$\tfrac{1}{2}|\tfrac{1}{2}[(n+1),S-1 + (n+1),S+1] - (n+1),S0|$$

where n, S0 represents the sample value at a sample position S0 in a horizontal scan line n;
said second algorithm is used to calculate a vertical concealment accuracy V as follows:

$$V = \tfrac{1}{2}|\tfrac{1}{2}[(n-1),S-1 + (n+1),S-1] - n,S-1| +$$
$$\tfrac{1}{2}|[\tfrac{1}{2}\{(n-1),S1 + (n+1),S1\} - n,S1]|$$

said third algorithm is used to calculate a positive diagonal concealment accuracy D+ as follows:

$$D^+ = \tfrac{1}{2}|\tfrac{1}{2}[(n-1),S-2 + (n+1),S0] - n,S-1| +$$
$$\tfrac{1}{2}|\tfrac{1}{2}[(n-1),S0 + (n+1),S2] - n,S1|$$

and said fourth algorithm is used to calculate a negative diagonal concealment accuracy D− as follows:

$$D^- = \tfrac{1}{2}|\tfrac{1}{2}[(n-1),S0 + (n+1),S-2] - n,S-1| +$$
$$\tfrac{1}{2}|\tfrac{1}{2}[(n-1),S2 + (n+1),S0] - n,S1|$$

said preferred algorithm being selected as that one of said first to fourth algorithms which results in the lowest value of concealment accuracy.

6. A method according to claim 5 further comprising multiplying each of said concealment accuracies H, V, D+, and D− by an associated weighting factor corresponding to the reciprocal of the distance between adjacent sample positions in the respective horizontal, vertical, positive diagonal, and negative diagonal directions and said preferred algorithm is then selected as the algorithm giving the lowest value of concealment accuracy after said multiplying by said associated weighting factor.

7. A method according to claim 1 wherein at least one of said algorithms uses sample signals located in fields or frames of said television signal preceding and succeeding the field or frame respectively containing said error sample signal.

8. Apparatus for concealing errors in a digital television signal, which television signal comprises a plurality of sample signals corresponding respectively to sample positions along a horizontal scan line of a television picture made up of a plurality of such lines, the apparatus comprising:
means operative in respect of each said sample signal which is in error to select from a plurality of algorithms a preferred algorithm for correcting such error sample signal;
means to calculate a corrected value of said error sample signal using said preferred algorithm; and
means to substitute said corrected value of said error sample signal for said error sample signal so as to conceal said error.

9. Apparatus according to claim 8 comprising:
means operative in respect of each said sample signal which is in error to use a first algorithm to calculate from available sample signals the expected value of a first sample signal corresponding to a first sample position adjacent to the sample position of said error sample signal;
means to check said expected value of said first sample signal against the actual value of said first sample signal;
means to use a second algorithm to calculate from available sample signals the expected value of a second sample signal corresponding to a second sample position adjacent to the sample position of said error sample signal;
means to check said expected value of said second sample signal against the actual value of said second sample signal; and
means to select one of said first and second algorithms in dependence on the results of said checking steps and to use said selected algorithm to calculate from available sample signals said corrected value of said error sample signal;
said first and second algorithms using sample signals located along respective different directions of said television picture.

10. Apparatus according to claim 8 comprising:
means operative in respect of each said sample signal which is in error to use a first algorithm to calculate from available sample signals the expected value of a first sample signal corresponding to a first sample position adjacent to the sample position of said error sample signals;
means to check said expected value of said first sample signal against the actual value of said first sample signal;
means operative in respect of each sample signal which is in error to use a second algorithm to calculate from available sample signals the expected value of a second sample signal corresponding to a second sample position adjacent to the sample position of said error sample signal;
means to check said expected value of said second sample signal against the actual value of said second sample signal;
means operative in respect of each said sample signal which is in error to use a third algorithm to calculate from available sample signals the expected value of a third sample signal corresponding to a third sample position adjacent to the sample position of said error sample signal;
means to check said expected value of said third sample signal against the actual value of said third sample signal;
means operative in respect of each sample signal which is in error to use a fourth algorithm to calculate from available sample signals the expected value of a fourth sample signal corresponding to a fourth sample position adjacent to the sample position of said error sample signal;
means to check said expected value of said fourth sample signal against the actual value of said fourth sample signal; and means to select one of said first to fourth algorithms in dependence on the results of said checking means and to use said selected algorithm to calculate from available sample signals said corrected value of said error sample signal;

said first to fourth algorithms using available sample signals located along respective different directions of said television picture.

11. Apparatus according to claim 10 wherein said different directions are the horizontal, vertical, positive diagonal, and negative diagonal directions of said television picture.

12. Apparatus according to claim 10 wherein said first algorithm is used to calculate a horizontal concealment accuracy H as follows:

$$H = \tfrac{1}{2}|\tfrac{1}{2}[(n-1),S-1 + (n-1),S+1] - (n-1),S0| + $$
$$\tfrac{1}{2}|\tfrac{1}{2}[(n+1),S-1 + (n+1),S+1] - (n+1),S0|$$

where n, S0 represents the sample value at a sample position S0 in a horizontal scan line n;

said second algorithm is used to calculate a vertical concealment accuracy V as follows:

$$V = \tfrac{1}{2}|\tfrac{1}{2}[(n-1),S-1 + (n+1),S-1] - n,S-1| + $$
$$\tfrac{1}{2}|[\tfrac{1}{2}\{(n-1),S1 + (n+1),S1\} - n,S1]|$$

said third algorithm is used to calculate a positive diagonal concealment accuracy D+ as follows:

$$D^+ = \tfrac{1}{2}|\tfrac{1}{2}[(n-1),S-2 + (n+1),S0] - n,S-1| + $$
$$\tfrac{1}{2}|\tfrac{1}{2}[(n-1),S0 + (n+1),S2] - n,S1|$$

and said fourth algorithm is used to calculate a negative diagonal concealment accuracy D− as follows:

$$D^- = \tfrac{1}{2}|\tfrac{1}{2}[(n-1),S0 + (n+1),S-2] - n,S-1| + $$
$$\tfrac{1}{2}|\tfrac{1}{2}[(n-1),S2 + (n+1),S0] - n,S1|$$

said preferred algorithm being selected as that one of said first to fourth algorithms which results in the lowest value of concealment accuracy.

13. Apparatus according to claim 12 further comprising means to weight said concealment accuracies H, V, D+, and D− by multiplying each by an associated weighting factor corresponding to the reciprocal of the distance between adjacent sample positions in the respective horizontal, vertical, positive diagonal, and negative diagonal directions and said preferred algorithm is then selected as the algorithm giving the lowest value of concealment accuracy after said multiplying by said associated weighting factor.

14. Apparatus according to claim 8, wherein at least one of said algorithms uses sample signals located in fields or frames of said television signal preceding and succeeding the field or frame respectively containing said error sample signal.

* * * * *